US008300663B2

(12) United States Patent (10) Patent No.: US 8,300,663 B2
Chion et al. (45) Date of Patent: Oct. 30, 2012

(54) DEDICATED ACKNOWLEDGEMENT AND DELIVERY OF MANAGEMENT MESSAGES IN WIRELESS COMMUNICATION SYSTEMS

(75) Inventors: Hua Mary Chion, Belle Mead, NJ (US); Jerry Pak Lup Chow, San Diego, CA (US); Hongyun Qu, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 243 days.

(21) Appl. No.: 12/769,578

(22) Filed: Apr. 28, 2010

(65) Prior Publication Data
US 2011/0069668 A1 Mar. 24, 2011

Related U.S. Application Data

(60) Provisional application No. 61/173,481, filed on Apr. 28, 2009.

(51) Int. Cl.
*H04L 12/56* (2006.01)
*H04L 1/18* (2006.01)
(52) U.S. Cl. ....................................................... 370/474
(58) Field of Classification Search .................. 370/394, 370/474, 476
See application file for complete search history.

(56) References Cited

U.S. PATENT DOCUMENTS

| | | | |
|---|---|---|---|
| 2007/0266292 | A1 | 11/2007 | Korndewal et al. |
| 2008/0137689 | A1 | 6/2008 | Shiizaki et al. |
| 2008/0207120 | A1 | 8/2008 | Kurina et al. |
| 2010/0067698 | A1* | 3/2010 | Hahn et al. ..................... 380/270 |
| 2010/0325507 | A1* | 12/2010 | Sung et al. ..................... 714/749 |
| 2011/0110343 | A1* | 5/2011 | Venkatachalam et al. ..... 370/338 |
| 2012/0005369 | A1* | 1/2012 | Capone et al. ................. 709/236 |
| 2012/0042222 | A1* | 2/2012 | Cha et al. ....................... 714/749 |

FOREIGN PATENT DOCUMENTS

| | | |
|---|---|---|
| KR | 10-0837434 | 6/2008 |
| KR | 10-2009-0035470 | 4/2009 |

OTHER PUBLICATIONS

Johnston et al., 'Overview of IEEE 802.16 Security', 2004, IEEE Security & Privacy, pp. 40-48.*
Cha et al., 'An Extended Header for ARQ retransmission', IEEE 802.16 Broadband Wireless Access Working Group, Apr. 27, 2009, pp. 1-6.*
Provisional U.S. Appl. No. 61/224,919, field Jul. 13, 2009, 14 pages.*
International Search Report and Written Opinion mailed on Dec. 13, 2010 for International Application No. PCT/US2010/032840, filed Apr. 28, 2010 (10 pages).

* cited by examiner

*Primary Examiner* — Melvin Marcelo
(74) *Attorney, Agent, or Firm* — Perkins Coie LLP

(57) ABSTRACT

Techniques and systems for acknowledging management message reception in a wireless communication system can include operating a first radio station to generate a management message that contains a sequence number unique to the management message and to direct the management message to a second radio station; and operating the second radio station, after receiving the management message from the transmitter, to generate and transmit, before decoding the content of the received the management message, an acknowledgement to the transmitter identifying the received manage message by the sequence number unique to the management message.

39 Claims, 10 Drawing Sheets

DEDICATED ACKNOWLEDGEMENT AND DELIVERY OF MANAGEMENT MESSAGES IN WIRELESS COMMUNICATION SYSTEMS

PRIORITY CLAIM AND CROSS REFERENCE TO RELATED APPLICATION

This patent document claims the benefit of the priority of U.S. Provisional Application Ser. No. 61/173,481, filed Apr. 28, 2009 and entitled "DEDICATED ACKNOWLEDGEMENT AND DELIVERY OF MANAGEMENT MESSAGES IN WIRELESS COMMUNICATION NETWORKS," the entire contents of which are incorporated by reference as part of the disclosure of this document.

BACKGROUND

This document relates to wireless communications in wireless communication systems.

Wireless communication systems and apparatuses use electromagnetic waves to communicate with mobile stations such as fixed and mobile wireless communication devices, mobile phones, fixed mobile devices, or laptop computers with wireless communication cards that are located within coverage areas of the wireless systems. A mobile station can be referred to as user equipment (UE), access terminal (AT), evolved access terminal (eAT), or a subscriber station (SS). Wireless communication systems and apparatuses can include one or more base stations to provide service in one or more wireless service areas. A base station can be referred to as an access point (AP) or access network (AN) or can be included as part of an access network or a base station subsystem (BSS). Further, a wireless communication system can include one or more core networks to control one or more base stations.

In some implementations, a wireless communication system communicates with mobile devices using a wireless technology based on orthogonal frequency division multiplexing (OFDM) such as Worldwide Interoperability for Microwave Access (WiMAX), e.g., IEEE 802.16m; or Long Term Evolution (LTE).

SUMMARY

This document describes technologies, among other things, for acknowledging message reception in a wireless communication system.

In one aspect, techniques for acknowledging management message reception in a wireless communication system can include operating a transmitter within the system to generate a management message that contains a sequence number unique to the management message and to direct the management message to a receiver in the system. Techniques can include operating the receiver, after receiving the management message from the transmitter, to immediately produce and transmit, without decoding the content of the received the management message, an acknowledgement (ACK) signal to the transmitter identifying the received manage message by the sequence number unique to the management message. Other implementations can include corresponding systems, apparatus, and computer programs, configured to perform the actions of the techniques, encoded on computer readable mediums.

These, and other implementations, can include one or more of the following features. Implementations can include operating a transmitter to start a retransmission timer after sending out the management message to the receiver and to wait for the ACK signal from the receiver during the duration of the retransmission of the timer. Implementations can include when the retransmission timer expires before receiving the ACK signal from the receiver, operating a transmitter to retransmit a management message with the same sequence number when the number of the retransmission is within a maximum retransmission number. Implementations can include operating, when the retransmission timer expires before receiving the ACK signal from the receiver, a transmitter to remove the management message from a retransmission queue of the transmitter after the number of the retransmission exceeds the maximum retransmission number. Implementations can include operating, when the ACK signal from the receiver is received before a retransmission timer expires, a transmitter to remove a management message from a retransmission queue of the transmitter. Implementations can include assigning, prior to transmitting a management message, an over-the-air resource for transmitting the management message from a transmitter to a receiver. Implementations can include synchronizing a transmitter and a receiver for assigning the sequence numbers for management messages. Implementations can include operating a receiver, based on a lack of receiving a management message, to allocate an over-the-air resource. Implementations can include operating a receiver, to send a negative acknowledgement to a transmitter. A negative acknowledgement can include an indication of an allocated over-the-air resource.

In another aspect, techniques can include assigning a sequence number to a management message to be delivered to a mobile station, generating a packet that can include the sequence number and at least a portion of the management message, the packet including an indicator that signals an acknowledgement to the packet is required, and causing the mobile station to send an acknowledgement based on receiving the packet. The acknowledgement can include the sequence number of the received packet. The mobile station can send the acknowledgement before decoding management message content in the received packet. Other implementations can include corresponding systems, apparatus, and computer programs, configured to perform the actions of the techniques, encoded on computer readable mediums.

These, and other implementations, can include one or more of the following features. A packet can include a message life time parameter. A packet can include a message retransmission timer parameter. A packet can include two or more management messages. A packet can include a unique sequence number for each of the included management messages. A packet can include a fragment of a management message.

Generating the packet can include generating multiple packets that include different fragments of the management message, respectively. Assigning the sequence number can include assigning the sequence numbers to the fragments. Implementations can include causing the mobile station to send an acknowledgement for each received fragment of the management message. Implementations can include starting a retransmission timer based on transmitting a first packet to the mobile station. Implementations can include transmitting, based on an expiration of the retransmission timer, a second packet to the mobile station. The second packet can be based on the first packet. The second packet can include the sequence number and an indication that the second packet is a retransmission.

Implementations can include causing a mobile station to maintain a list of received sequence numbers associated with one or more management messages, use the list to check for duplicate messages, and update the list based on one or more message life time parameters. Implementations can include allocating an over-the-air resource for a transmission of the acknowledgement. A packet can include information about an allocated over-the-air resource.

In another aspect, wireless communication systems can include two or more base stations. A base station can be configured to assign a sequence number to a management message to be delivered to a mobile station, generate a packet that can include the sequence number and at least a portion of the management message, the packet including an indicator that signals an acknowledgement to the packet is required, and cause the mobile station to send an acknowledgement based on receiving the packet. The acknowledgement can include the sequence number of the received packet. The mobile station can send the acknowledgement before decoding management message content in the received packet.

These, and other implementations, can include one or more of the following features. An acknowledgement can be sent as a separate signaling message. An acknowledgement can be included in a header of a packet data unit that contains a communication that is separate from the acknowledgement. A base station can be configured to generate multiple packets that include different fragments of the management message, respectively. The multiple packets can each include a unique sequence number that is associated with a respective fragment of the management message. The mobile station can send an acknowledgement for each received fragment of the management message.

A base station can be configured to start a retransmission timer based on transmitting a first packet to the mobile station and transmit, based on an expiration of the retransmission timer, a second packet to the mobile station. In some implementations, the second packet is based on the first packet. In some implementations, the second packet includes the sequence number and an indication that the second packet is a retransmission.

A packet can include multiple management messages. A packet can include a unique sequence number for each of the included management messages. A packet can include an indication that signals an acknowledgement to the packet is required. A packet can include a message life time parameter. A packet can include a message retransmission timer parameter.

A base station can be configured to cause the mobile station to maintain a list of received sequence numbers associated with one or more management messages, use the list to check for duplicate messages, and update the list based on one or more message life time parameters. A base station can be configured to allocate an over-the-air resource for a transmission of the acknowledgement. A packet can include information about the allocated over-the-air resource.

In another aspect, wireless communication systems and apparatuses can include transceiver circuitry to transmit and receive wireless radio signals and processor electronics communicatively coupled with the transceiver circuitry. In some implementations, the processor electronics are configured to receive a packet that can include management message content, the packet including a sequence number unique to the management message content, and send, before decoding the management message content, an acknowledgement to the management message content based on an acknowledgement requirement indication in the packet.

In some implementations, the processor electronics are configured to receive multiple packets that respectively include different fragments of the management message. The multiple packets can each include a sequence number that is unique to a fragment.

In some implementations, processor electronics are configured to maintain a list of received sequence numbers associated with one or more management messages, use the list to check for duplicate messages, and update the list based on one or more message life time parameters. A packet can include information about an allocated over-the-air resource for a transmission of the acknowledgement.

The details of one or more implementations are set forth in the accompanying attachments, the drawings, and the description below. Other features will be apparent from the description and drawings, and from the claims.

DETAILED DESCRIPTION

Figure 1:
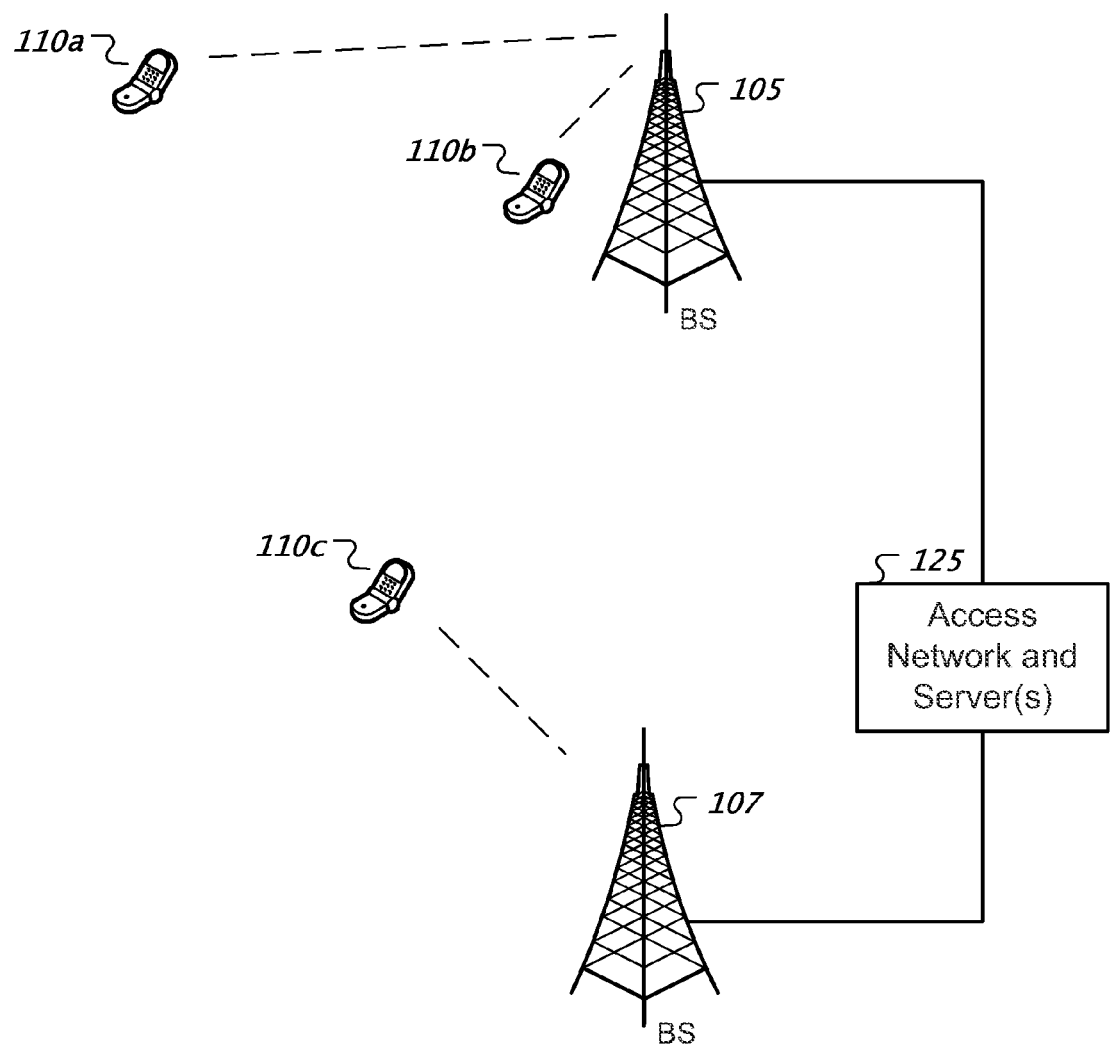
FIG. 1 shows an example of a wireless communication system.

The techniques and systems described in this document provide transport layer mechanisms for dedicated acknowledgement and delivery of management messages in wireless communication systems.

A transport-layer generic acknowledgement mechanism is provided using a unique sequence number for identifying a management message upon receiving either the entire or a part of the management message from a transmitter by a receiver without decoding the content of the received management message. As described in this document, a described transport-layer generic acknowledgement mechanism can provide benefits in wireless communications. For example, over the air communication tends to be unreliable, hence a wireless communication system may require acknowledgement from a receiver to confirm to a sender the reception of important signaling messages. Such acknowledgement should be timely transmitted as soon as possible to reduce the delay in message delivery. The described transport-layer generic acknowledgement mechanism provides an acknowledgement by the receiver to the sender without decoding the content of the received management message to reduce the response time for the acknowledgment to meet a timeliness requirement.

In some implementations, a transport-layer generic acknowledgement message indicates an acknowledgement of receiving a management message by providing a respective unique sequence number for a received management message without providing other information from the received messages to minimize the bandwidth for the acknowledgement. In some implementations, a transport-layer generic acknowledgement is generic to all management messages to reduce signaling protocol complexity.

A transport-layer generic acknowledgement mechanism can be used to improve and enhance signaling and operations of various wireless communication systems by providing reliable message delivery. Examples of wireless communication systems that can implement the present techniques and systems include, among others, wireless systems based on orthogonal frequency division multiplexing (OFDM) and orthogonal frequency division multiple access (OFDMA) such as systems based on an IEEE 802.16 standard, e.g., IEEE 802.16m.

A transport-layer generic acknowledgement mechanism can assign a sequence number to a management message, or fragment thereof. The mechanism can transmit a packet that contains the management message, or fragment thereof, and the assigned sequence number. Block size can vary and the retransmission can be the same as initial transmission.

In some implementations, a transport-layer generic acknowledgement mechanism does not require cumulative acknowledgements and allows each message or message fragment to be acknowledged immediately. Hence, such acknowledgement actions for different messages can be independent of one another. A transport-layer generic acknowledgement mechanism can be implemented to eliminate a requirement for a window size limitation due to a buffer constraint because management messages can be small in size and the frequency of sending management messages can be much less frequent than other messages such as messages carrying data payload.

A transport-layer generic acknowledgement mechanism can be implemented to provide security to the acknowledgement messages so that each acknowledgement message contains security content that allows the receiver of the acknowledgement message to validate the identity of the sender. A transport-layer generic acknowledgement mechanism can provide timely acknowledgements without cumulative acknowledgements. For example, a transport-layer generic acknowledgement mechanism can pre-allocate one or more uplink resources to allow a mobile station to transmit an acknowledgement in the uplink resource. A transport-layer generic acknowledgement mechanism can be configured to accommodate different retransmission timer values and life timer values for each message.

In some implementations, a transport-layer generic acknowledgement mechanism for reliable delivery and timely retransmission of control signaling can be configured to provide acknowledgement at the transport layer so that a receiver may detect receiving of a packet containing a management message or fragment of the message without decoding the message's content, provide transport layer timers to allow timely retransmission, provide generic acknowledgement signaling without message type, and provide transport layer sequencing to allow duplicate message detection at the receiver. The mechanism can use a message life time parameter, which is the total duration that a message or a fragment of a message is kept in a retransmission queue by a transmitter. The mechanism can use a maximum retry parameter which is the total number of retransmissions of a message.

FIG. 1 shows an example of a wireless communication system. A wireless communication system includes one or more base stations (BSs) 105, 107 that provide wireless service to mobile stations 110a, 110b, 110c. Base stations 105, 107 can provide wireless coverage in one or more radio cells. In some implementations, a base station 105, 107 includes directional antennas to produce two or more directional beams to provide wireless coverage in different sectors.

The wireless communication system can communicate with mobile stations 110a, 110b, 110c using a wireless technology such as one based on orthogonal frequency division multiplexing (OFDM) or orthogonal frequency division multiple access (OFDMA). The wireless communication system can use one or more protocols for medium access control (MAC) and Physical (PHY) layers. The techniques and systems described herein can be implemented in various wireless communication systems such as a system based on LTE or WiMAX, e.g., IEEE 802.16m.

An access network 125 can communicate with one or more base stations 105, 107. In some implementations, an access network 125 includes one or more base stations 105, 107. The access network 125 can include a mechanism to control frequency assignments within the wireless communication system. The access network 125 can include one or more servers. In some implementations, the access network 125 is in communication with a core network that provides connectivity with other wireless communication systems and wired communication systems.

Figure 2:
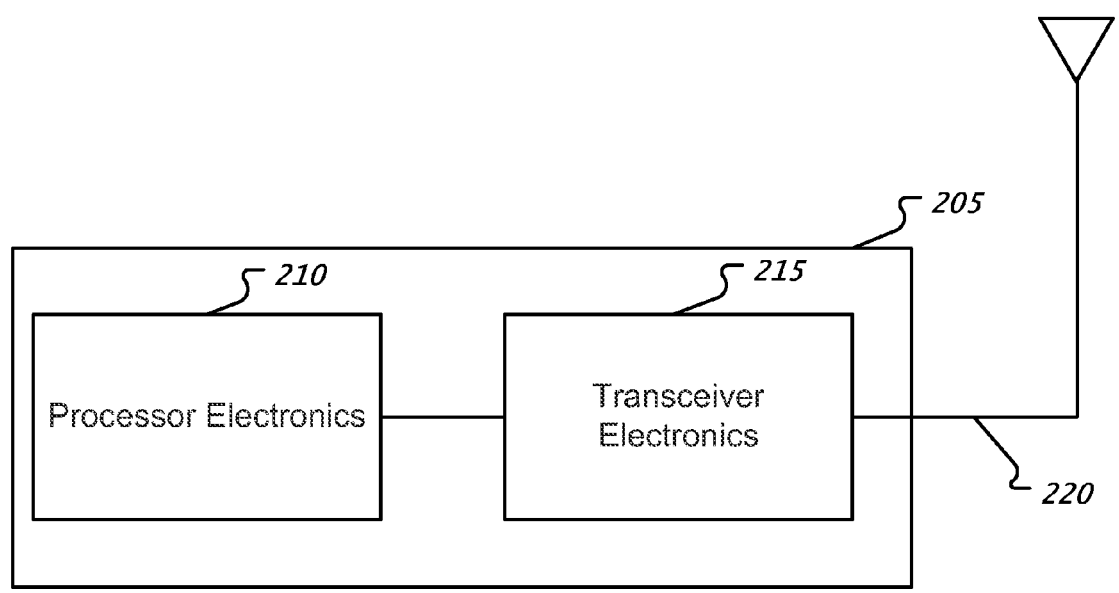
FIG. 2 shows an example of a radio station architecture for use in a wireless communication system.

FIG. 2 shows an example of a radio station architecture for use in a wireless communication system. Various examples of radio stations include base stations and mobile stations. A radio station 205 such as a base station or a mobile station can include processor electronics 210 such as a microprocessor that implements one or more of the techniques presented in this document. A radio station 205 can include transceiver electronics 215 to send and receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories configured to store information such as data and/or instructions. In some implementations, processor electronics 210 can include at least a portion of transceiver electronics 215.

A radio station can send and receive packets such as a packet including a Protocol Data Unit (PDU) such as a MAC PDU (MPDU). Radio stations that are in communication with each other are sometimes referred to as transmitters and receivers for convenience. For example, a "transmitter" as used herein refers to a radio station that receives and transmits signals. Likewise, a "receiver" as used herein refers to a radio station that receives and transmits signals. For example, a transmitter is an entity that, among other things, composes and transmits packets containing signaling content, whereas a receiver is an entity that, among other things, receives and processes packets containing signaling content. A transmitter can reside at a radio station such as base station or a mobile station. Likewise, a receiver can reside at radio station such as a base station or a mobile station.

Figure 3:
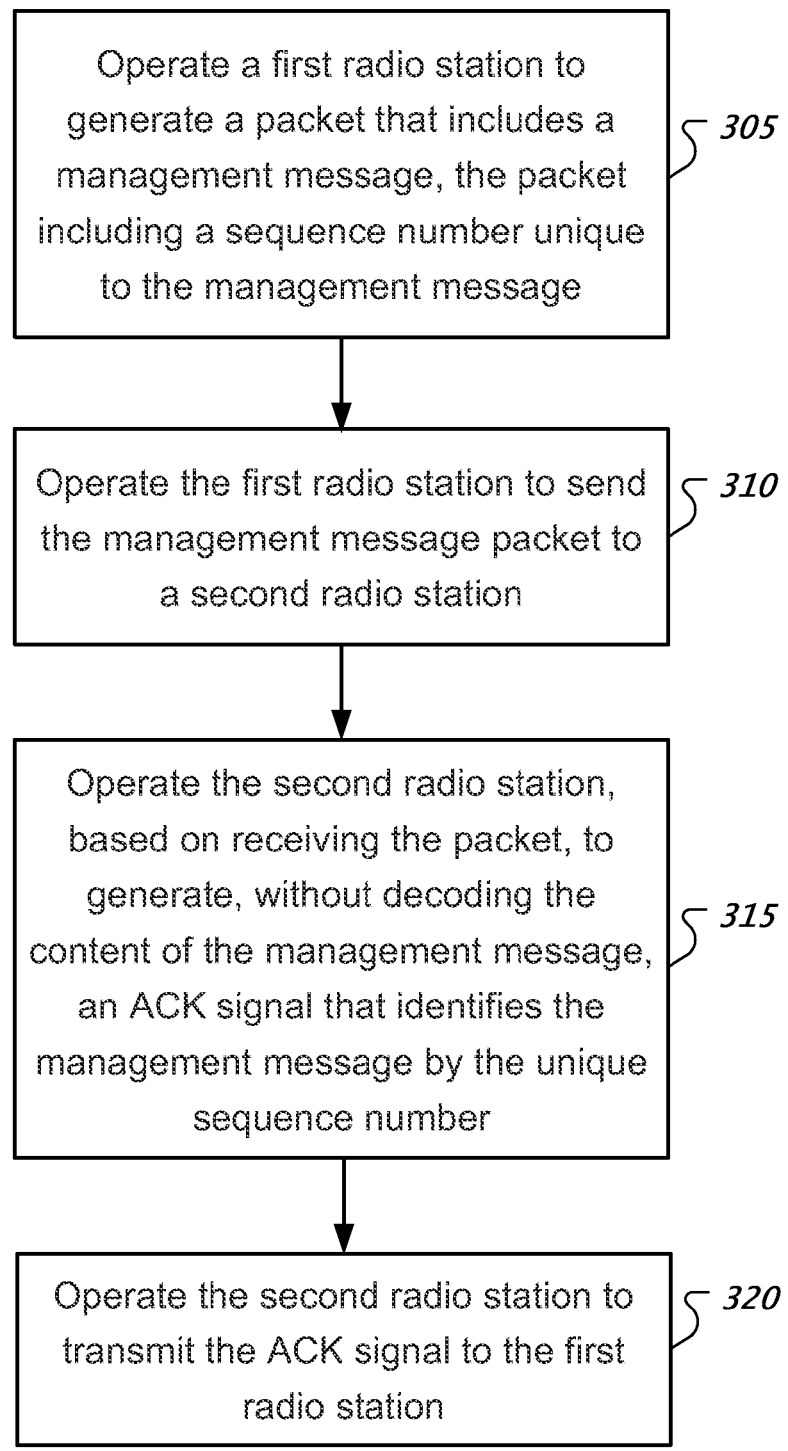
FIG. 3 shows an example of a communication process for acknowledgement processing.

FIG. 3 shows an example of a communication process for acknowledgement processing. At 305, a communication process can operate a first radio station to generate a packet that includes a management message, the packet including a sequence number unique to the management message. At 310, the process can operate the first radio station to send the management message packet to a second radio station. A packet can include one or more messages. In some implementations, a packet includes a fragment of a message.

At 315, the process can operate the second radio station, based on receiving the packet, to generate, without decoding the content of the management message in the packet, an acknowledgement (ACK) signal that identifies the received management message by the unique sequence number. At 320, the process can operate the second radio station to transmit the ACK signal to the first radio station.

A transmitter can include information for reliable delivery in a data packet. A receiver can use such information for sending an acknowledgement to the data packet. The information can include one or more of: an acknowledgement required indicator, a sequence number that is unique to each message or fragment of a message, a retransmission timer value, a value indicating the remaining of life time of the message, or a value indicating the remain numbering of retries.

Transmitters and receivers can communicate based on communication parameters. In some implementations, communication parameters can be negotiated during a mobile station network re-entry procedure using a capability information exchange procedure such as a Subscriber Station Basic Capability Request (SBC_RSP) and Subscriber Station Basic Capability Response (SBC_RSP) exchange. Various examples of communication parameters include a message retry timeout parameter, e.g., MSG_RETRY_TIMEOUT, and a message life time parameter, e.g., MSG_LIFETIME. In some implementations, a MSG_RETRY_TIMEOUT value is indicated by a MAC PDU that includes a MAC management message.

Based on transmitting the packet, the transmitter can start a retransmission timer. Expiration of the timer can cause the transmitter to retransmit the packet. For example, in the event that the transmitter does not receive an acknowledgement from receiver before the expiration of the retransmission timer, the transmitter can retransmit the packet. Based on a retransmission timer expiring before receiving an acknowledgement from a receiver, a transmitter can retransmit the packet. In some implementations, a transmitter increments a packet's associated retry counter based on retransmitting the packet. If a packet's maximum number of retries has not exceeded, the transmission can retransmit the packet. In some implementations, a retransmitted version of the original packet is not required to be identical to the original version of the packet. For example, the retransmitted version of the original packet can include information to indicate a retransmission.

A transmitter can remove a packet from a retransmission queue based on a retry counter exceeding a maximum retry value. A transmitter can remove a packet from a retransmission queue based on receiving an acknowledgement from a receiver.

The transmitter can fragment a message into multiple message fragments. The transmitter can transmit each message fragment in a separate packet. In some cases, a message requires reliable delivery and fragmentation. Each message fragment can be treated individually. For example, each received fragment of the message can cause a receiver to send an acknowledgement. The transmitter can retransmit a message fragment, individually, as required. In some implementations, if retransmission for a message fragment is required, the same message fragment is retransmitted in a separate packet. Based on removing a fragment of a message from a retransmission queue due to event such as exceeding a maximum retry number or expiration of a message life time, the transmitter can remove other fragments of the same message from the retransmission queue.

In some implementations, a transmitter can assign a sequence number to a new message or fragment as: (Last_Assigned_SN+1) mod MAX_SN, where Last_Assigned_SN represents the last assigned sequence number and MAX_SN represents the maximum assignable sequence number. In some implementations, a transmitter can determine whether sequence number is in use before assigning the sequence number to a new message. In some implementations, a sequence number is 'in use' when the sequence number's associated life time has not expired.

A transmitter can maintain a value to track the oldest in use sequence number. The transmitter can check a value, e.g., an Oldest_In_Use_SN value, before assigning a sequence number to a new message. A transmitter can initialize the Oldest_In_Use_SN value to the first assigned sequence number. When the life time of the sequence number corresponding to the Oldest_In_Use_SN value expires, the transmitter can update the Oldest_In_Use_SN value to the next in use sequence number sequentially. In some implementations, life time of the sequence number corresponding to the Oldest_In_Use_SN value expires, the transmitter increments Oldest_In_Use_SN modulo the maximum sequence number value. If the next assigned SN would be equal to the Oldest_In_Use_SN, the transmitter can temporally suspend the transmission of new messages requiring acknowledgements.

A receiver can receive a packet that includes information, such as an indicator, indicating that an acknowledgement of the packet's content is required. The receiver can send an acknowledgement message that includes the sequence number found in the received packet without decoding the packet's signaling content. In some implementations, a receiver can individually acknowledge received message fragments. In some implementations, a base station can pre-assign one or more over-the-air resources for a mobile station to transmit acknowledgements. In some implementations, a mobile station can request one or more over-the-air resources to transmit an acknowledgement.

A receiver can maintain a list that includes received sequence numbers. In some implementations, if a packet is received with a sequence number that is not in the list, the receiver adds the sequence number, along with a remaining life time value, that is associated with the packet, to the list. In some implementations, a remaining life time value is specified by the transmitter. In some implementations, a remaining life time value is calculated based on a maximum retry value and a retransmission timer parameter. If a packet is received containing a sequence number that exists on the list, the receiver can drop the payload of the packet without further processing the packet. In some implementations, a sequence number is removed from the list when its associated remaining life time value reaches zero. In some implementations, a sequence number is removed from the list based on an update of an Oldest_In_Use_SN value.

A base station can use one or more techniques to assign sequence numbers. Techniques for assigning sequence numbers can include using one or more sets of sequence numbers per management connection.

Techniques for assigning sequence numbers can include using one set of sequence numbers per management connection. In some implementations, a sequence number is assigned in a continuous sequential order. In some implementations, each fragment is assigned one unique sequence number. A message that does not require fragmentation can be considered as a single fragment. In some implementations, sequence numbers assigned to fragments of a message are required to be contiguous. In some implementations, a management payload within a packet is uniquely identified by a sequence number.

Techniques for assigning sequence numbers can include using two sets of sequence number per management connection. Using two sets of sequence number per management connection can include using a set for messages and a different set for message fragments. In some implementations, sequence numbers are assigned in a continuous sequential order. In some implementations, a message sequence number is assigned to each message. When a message is fragmented, a fragment sequence number can be assigned to each fragment of the message. In some implementations, a management payload within a packet is uniquely identified based on a message sequence number and fragment sequence number.

A wireless communication system can use one or more mechanisms to maintain synchronization between a transmitter and a receiver. For example, a transmitter and a receiver can maintain synchronization of a list of 'in use' sequence numbers. In some implementations, a transmitter updates a receiver of a change in Oldest_In_Use_SN through sending signaling information. In some implementations, a transmitter sends signaling information in a stand alone message. In some implementations, a transmitter sends signaling information in an extended header appended to a MAC PDU containing signaling content.

In some implementations, for each transmission, a transmitter includes a retry count associated with a message. The receiver can use a retry count to calculate a remaining life time associated with the message.

In some implementations, a wireless communication system can provide a total allowed in use sequence number value, e.g., Total_Allowed_In_Use_SN value. The transmitter can assign a sequence number to a new message if the sequence number is within a window. In some implementations, the window is from Oldest_In_Use_SN to (Oldest_In_Use_SN+Total_Allowed_In_Use_SN) mod MAX_SN. The receiver can maintain an Oldest_In_Use_SN value and a Total_Allowed_In_Use_SN value. Receiving a packet containing a sequence number outside of a window can indicate that the Oldest_In_Use_SN value has changed at the transmitter. For example, receiving a packet containing a sequence number outside of a window from Oldest_In_Use_SN to (Oldest_In_Use_SN+Total_Allowed_In_Use_SN) mod MAX_SN, can indicate such a change. The receiver can update its Oldest_In_Use_SN value based on the detected change.

A packet such as a MAC PDU can include a single management message or a fragment of a management message. If a packet is retransmitted, the same payload (e.g., the same message or the fragment of the MAC management message) can be retransmitted. A MAC PDU can include a fragmentation extended header (FEH). A FEH can include acknowledgement signaling information. If a MAC management message requires a delivery acknowledgement, the MAC PDU can include a FEH regardless of whether the message requires fragmentation. A FEH can include an acknowledgement required field such as an ACK_REQ bit to indicate that an acknowledgement is required. An ACK_REQ bit value of one can signal that the SN in the received MAC PDU shall be used as the sequence number for acknowledgement of the received MAC PDU.

A MAC PDU containing a MAC management message can include an ACK_INFO extended header. An ACK_INFO extended header can include additional information related to an acknowledgment procedure. The ACK_INFO extended header can include a MSG_RETRY_TIMEOUT for an attached message. A received MSG_RETRY_TIMEOUT value can override a pre-negotiated message retry timeout value at network entry time. A base station can perform resource allocation for acknowledgement transmission in a downlink MAC PDU based on the base station pre-assigning resources for a mobile station to transmit an acknowledgement.

Figure 4:
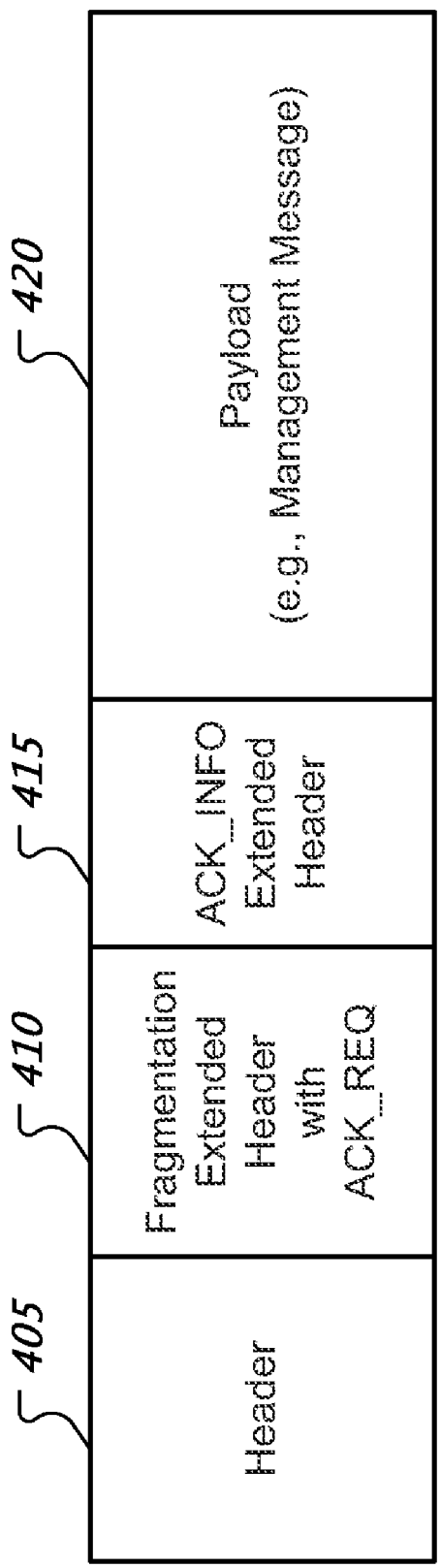
FIG. 4 shows an example of a packet layout that contains acknowledgement signaling information and a payload.

FIG. 4 shows an example of a packet layout that contains acknowledgement signaling information and a payload. A packet can include a header 405, a fragmentation extended header 410, an $ACK_{13}$ INFO extended header 415, and a payload 420 such as a management message. A fragmentation extended header 410 can include an acknowledgement required indication, e.g., ACK_REQ. In some implementations, a payload 420 can include a fragment of a management message.

Resource allocation for an acknowledgement transmission can be communicated using one or more techniques. For example, a base station can include a frame number and sub frame number to transmit an acknowledgement. For a downlink MAC PDU, the base station can pre-assigned an uplink resource for a mobile station to transmit an acknowledgement. The frame number of the pre-assigned uplink allocation can be included to direct the mobile station to transmit an acknowledgement at the specified frame. In another example, a base station can include one or more parameters indicating a resource block for an uplink communication.

When transmitting a packet that requires an acknowledgement, a transmitter can include a FEH in the packet. The FEH can include an acknowledgement required indicator and a sequence number. In the FEH, the transmitter can set, for an initial transmission, a sequence number to (Last_Transmitted_SN+1) mod MAX_SN. In some implementations, MAX_SN is 256. For retransmission, the transmitter can use the same sequence number from the initial transmission.

A transmitter can include ACK_INFO extended header in a MAC PDU. An ACK_INFO extended header can include a MSG_RETRY_TIMEOUT value, the number of retries, and resource allocation information. A resource allocation can be set for a downlink MAC PDU.

After transmitting a MAC PDU with a MAC management message, a transmitter can start a retransmission timer, e.g., a timer based on a MSG_RETRY_TIMEOUT parameter. The transmitter can store the MAC management message with its assigned sequence number in a retransmission buffer. A timer based on a MSG_LIFETIME parameter can be started based on the initial transmission of a MAC management message, or fragment thereof.

A transmitter can receive an acknowledgement with a sequence number. Based on the acknowledged sequence number, the transmitter can remove the associated message or message fragment from a retransmission buffer. In some implementations, the transmitter can stop associated timers based on the acknowledged sequence number. If a MSG_RETRY_TIMEOUT timer expires prior to receiving an acknowledgement with a sequence number, the transmitter can retransmit the MAC management message or message fragment with the same sequence number that was used in the initial transmission.

In some implementations, a MAC PDU is transmitted based on a hybrid automatic repeat request (HARQ). A NACK from HARQ after a HARQ process is terminated can trigger a retransmission of messages prior to a MSG_RETRY_TIMEOUT. In this case, a MSG_RETRY_TIMEOUT timer is restarted.

Based on an expiration of a MSG_LIFETIME timer, a transmitter can remove an message associated with the timer from a retransmission buffer and can stop one or more associated timers. In a case where a message is fragmented for transmission, the transmitter can remove the fragments related to the same message from a retransmission buffer.

Based on a correctly decoded MAC PDU that requires an acknowledgement, a receiver can send an acknowledgement to the transmitter. A receiver can maintain a list of received sequence numbers and their associated life time values. In some implementations, a receiver can compare a received sequence number with the ones in the list. If the received sequence number is not on the list, the receiver can pass the payload to an upper MAC process to process the signaling content. Further, the receiver can add the received sequence number to the list and can starts a MSG_LIFTIME timer that is associated with the received sequence number. However, if the receiver finds the received sequence number on the list, the receiver can consider the received MAC PDU to contain a duplicate message and can discard the associated payload.

If MSG_LIFETIME timer expires for a sequence number on the list, the receiver can remove the sequence number from the list. If the MAC PDU contains a fragment of a message, the receiver stores the fragment until the complete message is received.

A wireless communication system can provide one or more mechanisms for communicating acknowledgements. Various examples of mechanisms for communicating acknowledgements include using an acknowledgement message, using an acknowledgement extended header, and using an acknowledgement via a pre-allocated fast feedback region.

For an acknowledgement of a received packet, a recipient can send a packet that includes an acknowledgement message. An acknowledgement message can include the sequence number that was received by the recipient in a packet containing a management message. An acknowledgement message packet can include a message authentication code such as a cipher-based message authentication code (CMAC) or a hash-based message authentication code (HMAC).

In another aspect, for an acknowledgement of a received packet, a recipient can send a packet that includes an acknowledgement extended header. In some implementations, an acknowledgement extended header can piggyback with other data transmission. In some implementations, an acknowledgement extended header is used as a stand alone signaling header with no payload. An acknowledgement extended header can include a type field set to indicate a message acknowledgement. An acknowledgement extended header can include a sequence number. For example, an acknowledgement extended header can include the sequence number that was received by the recipient in a packet containing a management message In yet another aspect, for an acknowledgement of a received packet, a recipient can send an acknowledgement in a pre-allocated fast feedback region. In some implementations, a recipient can send an acknowledgement based on a pre-allocated coded PHY channel. In some implementations, a base station can pre-allocate a coded uplink PHY channel for a mobile station to transmit an acknowledgement. A pre-allocation can be included in ACK_INFO extended header attached to a MAC PDU that requires an acknowledgement.

Figure 5:
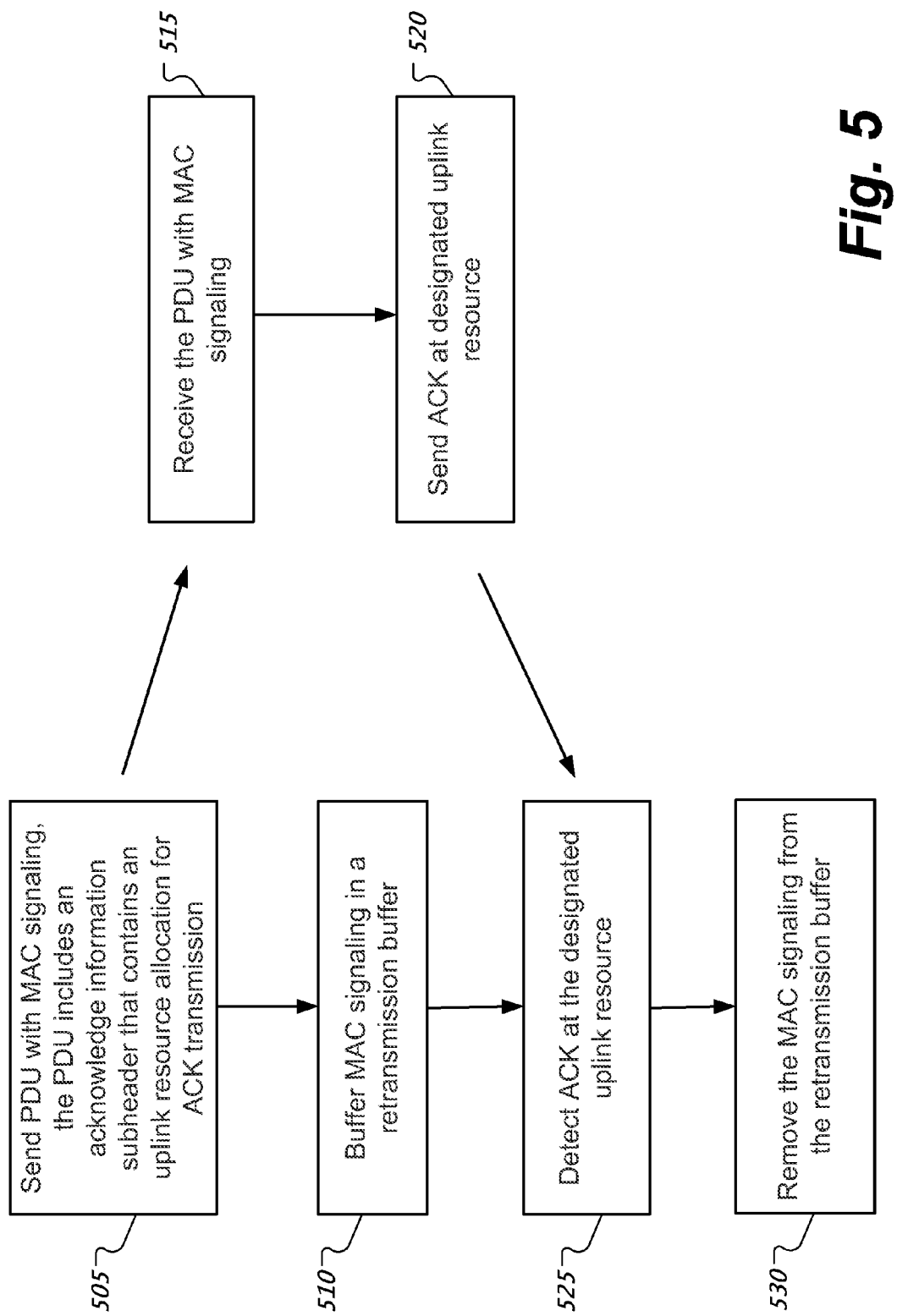
FIG. 5 shows an example of a communication flow that includes an acknowledgement sent by a mobile station.

FIG. 5 shows an example of a communication flow that includes an acknowledgement sent by a mobile station. In this example, a base station is communicating with a mobile station. At 505, the base station sends a PDU with MAC signaling. The PDU can include an acknowledge information subheader. The acknowledge information subheader can include an uplink resource allocation for an acknowledgement transmission. At 510, the base station buffers the MAC signaling in a retransmission buffer. In some implementations, the base station stores the transmitted PDU in a retransmission buffer.

At 515, the mobile station successfully receives the PDU with MAC signaling from the base station. The mobile station can process the MAC signaling in the PDU to retrieve information regarding the designated uplink resource. At 520, the mobile station sends an ACK at the designated uplink resource.

At 525, the base station successfully detects the ACK at the designated uplink resource. At 530, the base station removes the MAC signaling from the retransmission buffer.

Figure 6:
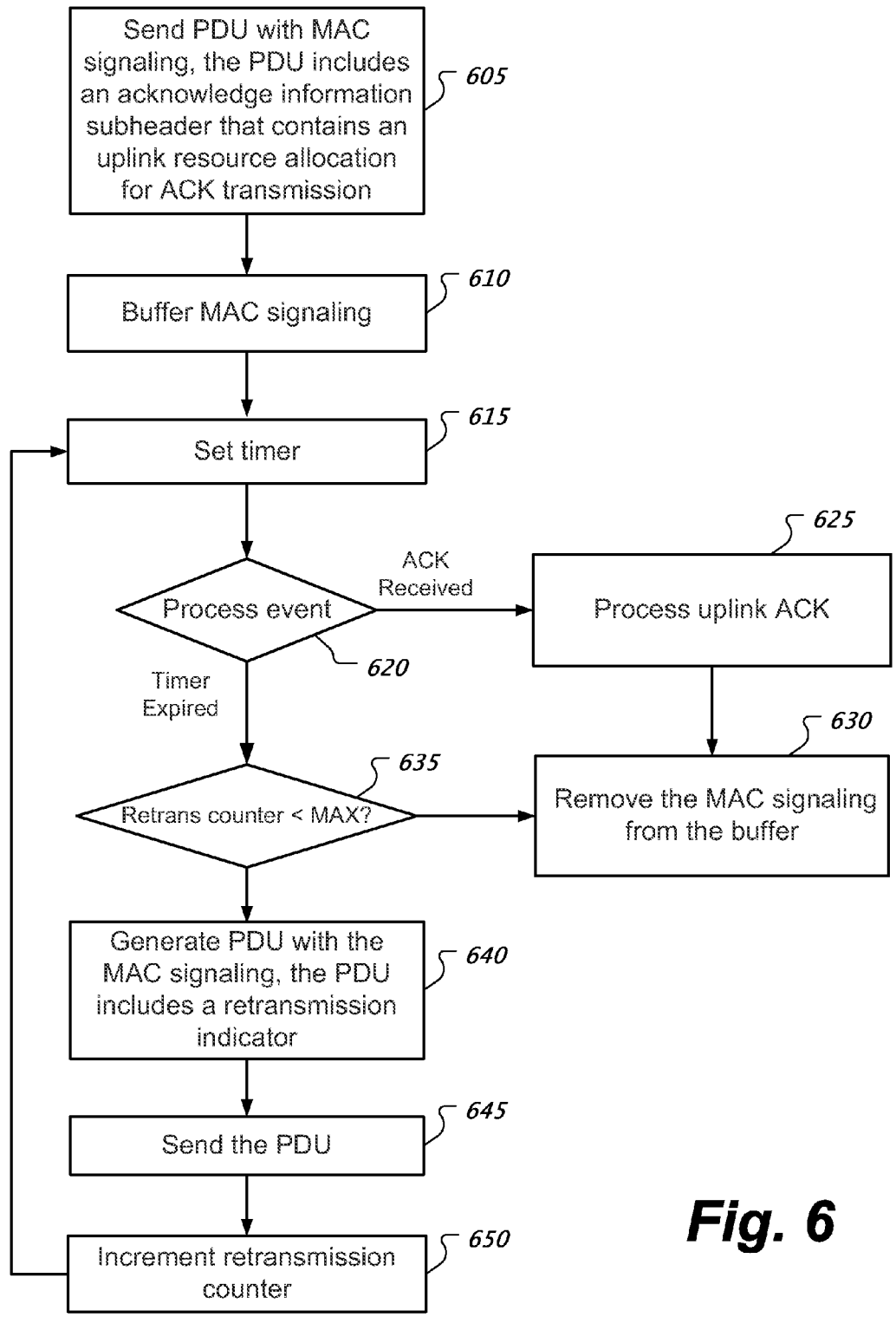
FIG. 6 shows an example of a base station communication process.

FIG. 6 shows an example of a base station communication process. At 605, a base station sends a PDU with MAC signaling to a mobile station. The PDU can include an acknowledge information subheader that contains an uplink resource allocation for ACK transmission. At 610, the base station buffers the MAC signaling. At 615, the base station sets a timer associated with the PDU. In some implementations, the base station can set a timer based on a retransmission timer duration parameter. In some implementations, the base station can initialize a retransmission counter to zero.

At 620, the base station processes one or more events such as an ACK received event or a timer expired event. In the case of an ACK received event, at 625, the base station processes the uplink ACK. In this case, the ACK indicates that the mobile station has successfully received the PDU with the MAC signaling. At 630, the base station removes the MAC signaling from the buffer. In the case of an timer expired event, at 625, the base station compares a retransmission counter with a maximum retransmission counter value. If the retransmission counter is equal to or greater than the maximum value, at 630, the base station removes the MAC signaling from the buffer.

If the retransmission counter is less than the maximum value, at 640, the base station generates a PDU with the MAC signaling that was sent at 605. The PDU includes a retransmission indicator set to indicate a retransmission (e.g., a value of one). In some implementations, an acknowledgement information subheader can include a retransmission indicator. Generating a PDU with MAC signaling can including retrieving MAC signaling stored in a buffer. At 645, the base station can send the PDU to the mobile station. At 650, the base station can increment the retransmission counter. The base station, at 615, can set a new timer to monitor for an acknowledgement.

Figure 7:
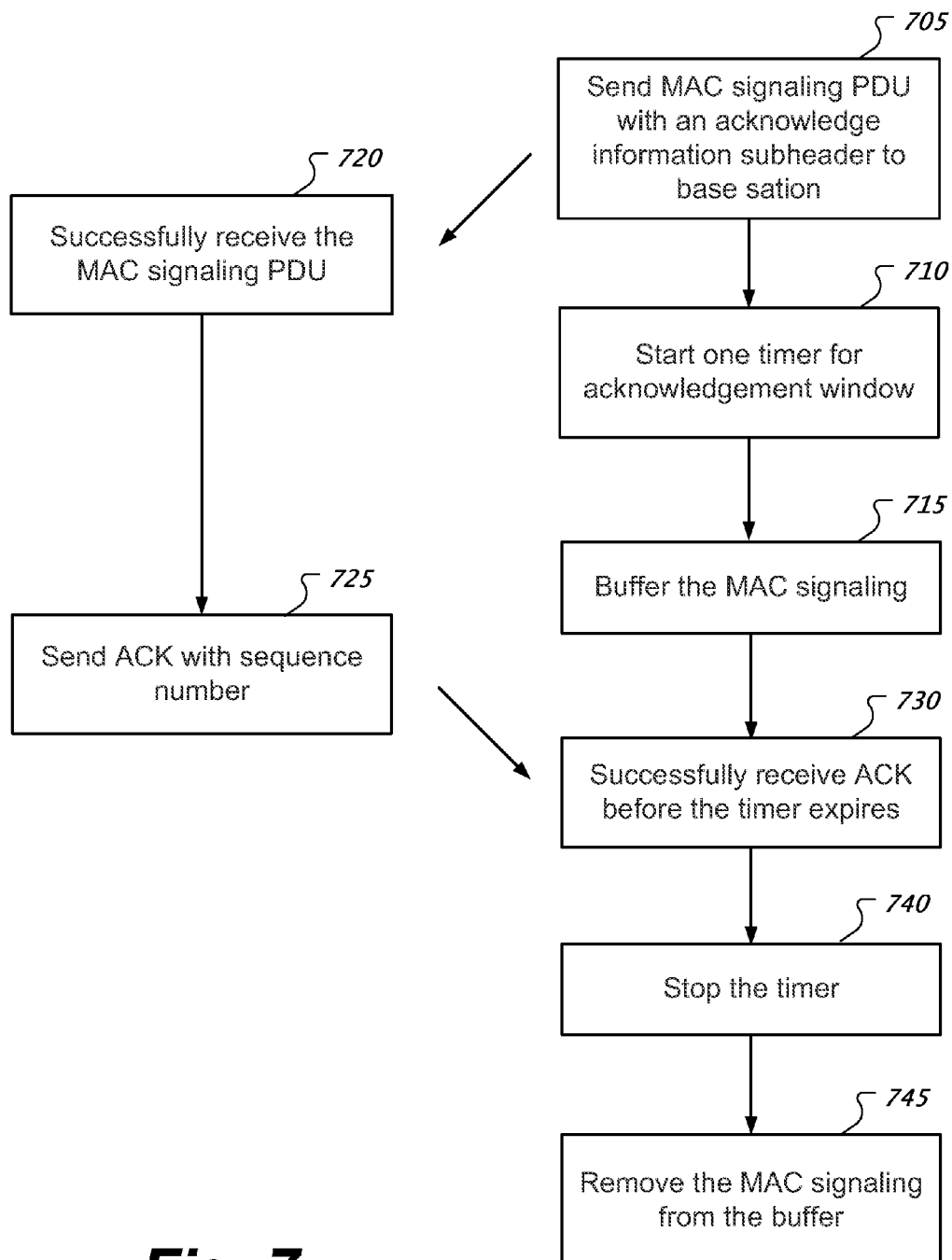
FIG. 7 shows an example of a communication flow that includes an acknowledgement sent by a base station.

FIG. 7 shows an example of a communication flow that includes an acknowledgement sent by a base station. At 705, a mobile station sends MAC signaling PDU with an acknowledge information subheader. At 710, the mobile station starts one timer for an acknowledgement window. At 715, the mobile station buffers the MAC signaling.

At 720, the base station successfully receives the MAC signaling PDU. At 725, the base station sends an ACK with a sequence number. At 730, the mobile station successfully receives the ACK before the timer expires. In response to the ACK, the mobile station, at 740, stops the timer. At 745, the mobile station removes the MAC signaling from the buffer.

The mobile station can use a re-transmission counter and re-transmission timer to control retransmission in the event where an ACK, corresponding to the PDU sent at 705, was not received.

Figure 8:
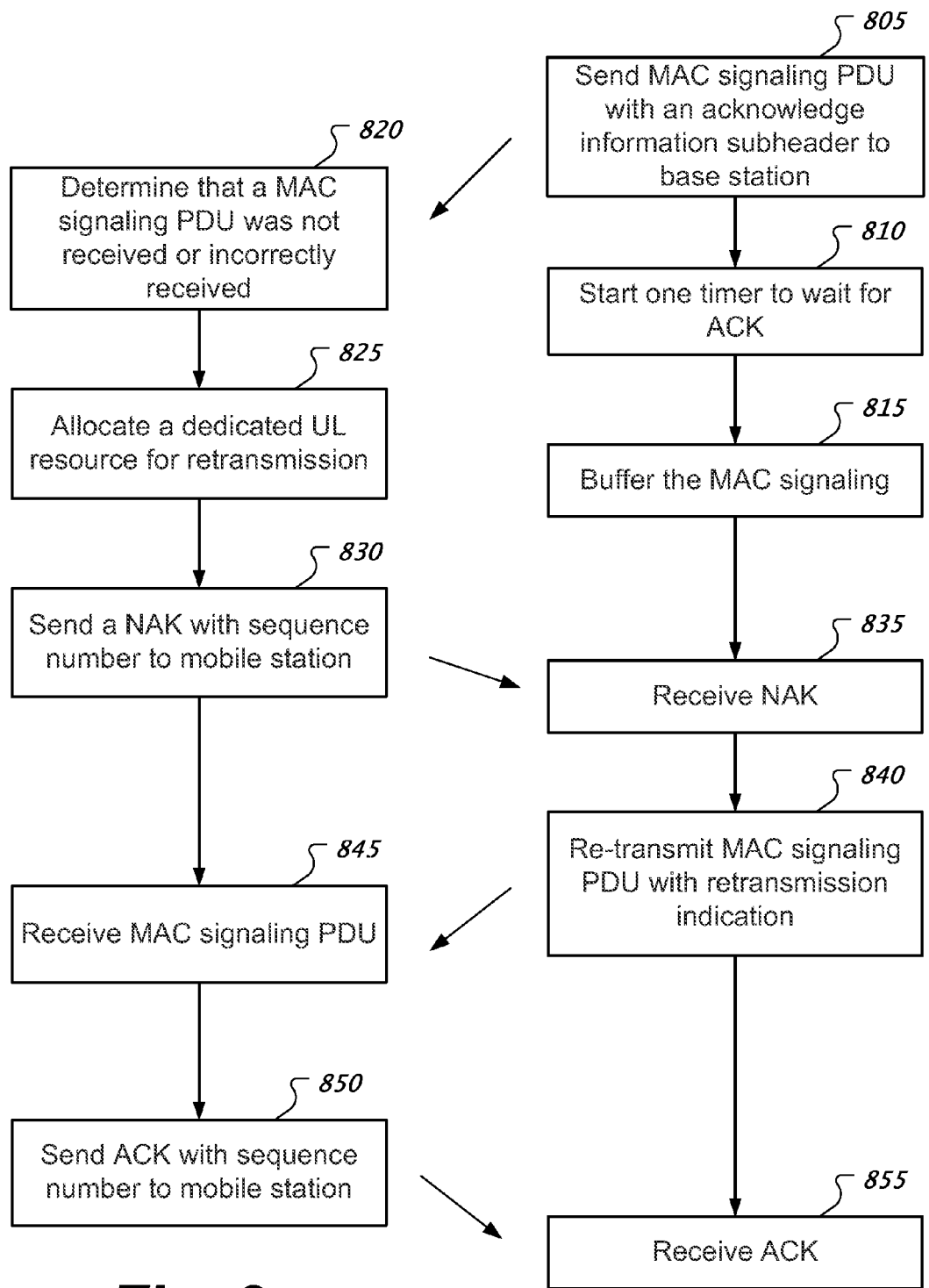
FIG. 8 shows an example of a communication flow that includes a negative acknowledgement sent by a base station.

FIG. 8 shows an example of a communication flow that includes a negative acknowledgement sent by a base station. At 805, a mobile station sends MAC signaling PDU with an acknowledge information subheader to a base station. At 810, the mobile station starts one timer to wait for ACK. At 815, the mobile station buffers the MAC signaling.

In this example, the MAC signaling PDU is not successfully received by the base station. At 820, the base station determines that a MAC signaling PDU was not received or incorrectly received. In some implementations, such determining can include using a timer. In some implementations, such determining can include detecting that a MAC signaling PDU was not received at an allocated uplink resource. At 825, the base station allocates a dedicated UL resource for retransmission. At 830, the base station sends a negative acknowledgement (NAK) with sequence number to the mobile station. In some implementations, the NAK can include an indication of the dedicated UL resource for retransmission.

At 835, the mobile station receives the NAK. At 840, the mobile station retransmits the MAC signaling PDU with a retransmission indication. In some implementations, the mobile station retransmits the MAC signaling PDU based on a dedicated UL resource allocation information included in a NAK.

At 845, the base station successfully receives the MAC signaling PDU. The base station can process the MAC signaling PDU to retrieve a sequence number. At 850, the base station sends an ACK with the sequence number to the mobile station. At 855, the mobile station successfully receives the ACK.

A radio station can include two or more messages in one MAC PDU. In some implementations, for each management message requiring ACK, one fragmentation extended header is included before a SDU or a SDU fragmentation. A SDU can include a management message. In some implementations, for each signaling extended header requiring ACK, one fragmentation extended header is included before each MAC signaling extended header.

Figure 9:
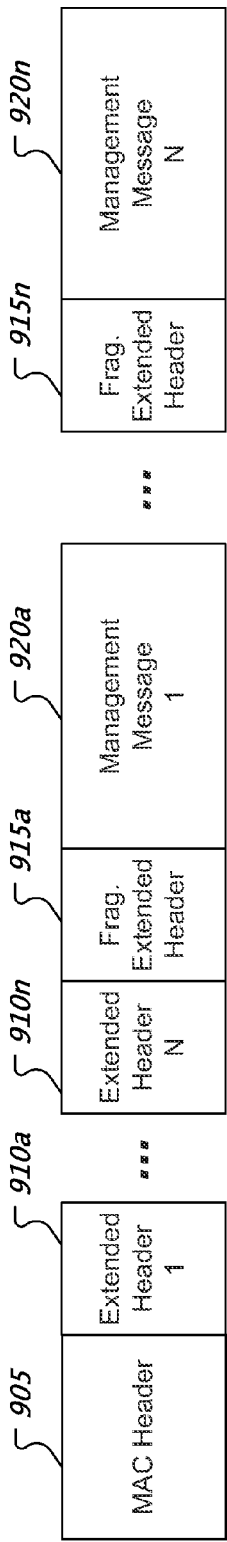
FIG. 9 shows an example of a packet layout with multiple management messages.

FIG. 9 shows an example of a packet layout with multiple management messages. A packet such as a MAC PDU can include a MAC header 905. The packet can include two or more extended headers 910*a*, 910*n*. For each management message 920*a*, 920*n* that requires an ACK, a radio station can include a fragmentation extended header 915*a*, 915*n* adjacent to and precedes the corresponding management message 920*a*, 920*n*.

Figure 10:
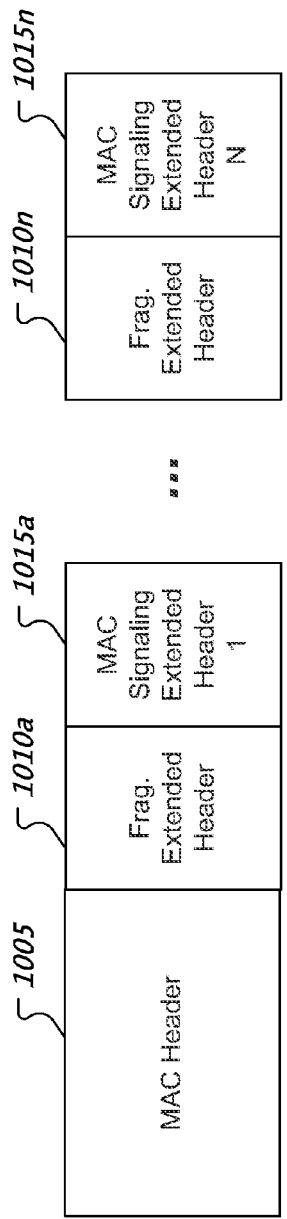
FIG. 10 shows an example of a packet layout with multiple signaling extended headers.

FIG. 10 shows an example of a packet layout with multiple signaling extended headers. A packet such as a MAC PDU can include a MAC header 1005. The packet can include two or more fragmentation extended headers 1010*a*, 1010*n*. The packet can include two or more MAC signaling extended headers 1015*a*, 1015*n*. For a MAC signaling extended header 1015*a*, 1015*n* that requires an ACK, a radio station can include one fragmentation extended header 1010*a*, 1010*n* before the corresponding MAC signaling extended header 1015*a*, 1015*n*.

This document includes additional descriptions and examples of techniques for MAC layer acknowledgement to MAC management messages. For example, this document includes additional descriptions and examples of acknowledgement mechanisms that provide reliable delivery and timely retransmission of critical MAC management messages. An acknowledgement mechanism can provide acknowledgements at a transport layer. Based on receiving a message such as a MAC management message or a fragment of a message, such a mechanism can cause a transmission of an acknowledgment without decoding message content. An acknowledgement mechanism can include one or more transport layer timers to allow timely retransmission. An acknowledgement mechanism can provide generic ACK signaling without a message type. An acknowledgement mechanism can provide transport layer sequencing to allow duplicate message detection at receiver.

To acknowledge a received message, a radio station can send an acknowledgement message such as a AAI_MSG ACK message or a message with an ACK extended header (MAEH). If a MAC management message requires reliable transmission, the sender of the message can include a FEH in a MAC PDU containing the MAC management message or a fragment of the message. Within the FEH, an ACK_REQ bit can be set to 1 and the SN can be set to the next SN value that uniquely identifies the message or the fragment of message.

In some implementations, a transmitter can send a message with a MAC control extended header (MCEH) that includes acknowledgement signaling information. For example, a MCEH can include a sequence number indicator. Based on the sequence number indicator, a radio station that receives a MCEH can process the MCEH to retrieve polling information such as whether an acknowledgement is required, fragmentation control information, and a payload sequence number.

Based on a transmission of the message, the sender can start a retransmission timer to wait for the acknowledgement indication. In some implementations, a value of retransmission timer is set on a per message basis. In some implementations, a value of retransmission timer is set on a per management connection basis. In some implementations, a value of a retransmission timer is negotiated during a network entry procedure.

When a MAC PDU over a management connection is received with an ACK_REQ bit set to 1, an acknowledgement can be sent to the sender prior to the expiration of the sender's retransmission timer. An acknowledgement indication can include the sequence number in the received MAC PDU. If HARQ is applied during the transmission of a MAC management message and if the HARQ process is terminated with an unsuccessful outcome before the expiration of the retransmission timer, the transmitter can initiate a retransmission of the message or the message fragment of the failed HARQ burst.

Figure 11:
FIG. 11 shows an example of a layout of a fragmentation extended header.

FIG. 11 shows an example of a layout of a fragmentation extended header. A fragmentation extended header 1105 can be used when a MAC PDU contains a management message payload. A management connection mechanism can use one or more fragmentation extended headers. A fragmentation extended header 1105 can include a last field that is set to one, a TYPE field that includes extended header type information, a SN field that includes a payload sequence number, and a FC field that includes a fragmentation control bits definition. The header 1105 can include an ACK_REQ field that includes information on whether an acknowledgement is required. For example, when the ACK_REQ is set to 1, the receiver of the MAC PDU can send an acknowledgement such as an AAI_MSG-ACK message or an ACK extended header to acknowledge the reception of the MAC PDU. In some implementations, the last field is 1 bit, the TYPE field is 4 bits, the SN is 8 bits, and the FC is 2 bits.

Figure 12:
FIG. 12 shows an example of a layout of a message acknowledgement extended header.

FIG. 12 shows an example of a layout of a message acknowledgement extended header. A radio station can send a packet with a message ACK extended header 1205 to indicate the reception of a MAC management or a fragment of a MAC management message. When receiving a MAC PDU over a management connection with an ACK_REQ set to 1, a radio station can transmit message ACK extended header 1205 as an acknowledgement to a received MAC PDU.

A message ACK extended header 1205 can include a last field to signal a last extended hearer indication, a TYPE field that includes extended header type information, an ACK_SN field that includes a payload sequence number for the MAC PDU being acknowledged, a RSV field that includes a fragmentation control bits definition. In some implementations, the last field is 1 bit, the TYPE field is 4 bits, the ACK_SN is 8 bits, and the RSV is 3 bits.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for acknowledging management message reception in a wireless communication system, comprising:
    operating a transmitter within the system to generate a management message that contains a sequence number unique to the management message and to direct the management message to a receiver in the system; and
    operating the receiver, after receiving the management message from the transmitter, to generate and transmit, without decoding the content of the received the management message, an acknowledgement (ACK) signal to the transmitter identifying the received manage message by the sequence number unique to the management message.

2. The method of claim 1, comprising:
    operating the transmitter to start a retransmission timer based on sending the management message to the receiver and to wait for the ACK signal from the receiver during a duration of the retransmission timer.

3. The method of claim 2, comprising:
    operating, based on an expiration of the retransmission timer, the transmitter to (1) retransmit the management message with the same sequence number when a retransmission counter is less than or equal to a maximum retransmission number and (2) remove the management message from a retransmission queue of the transmitter when the retransmission counter exceeds the maximum retransmission number.

4. The method of claim 2, comprising:
    when the ACK signal from the receiver is received before an expiration of the retransmission timer, operating the transmitter to remove the management message from a retransmission queue of the transmitter.

5. The method of claim 1, comprising:
    prior to transmitting the management message, assigning an over-the-air resource for transmitting the management message from the transmitter to the receiver.

6. The method of claim 1, comprising:
synchronizing the transmitter and the receiver for assigning sequence numbers for management messages.

7. The method of claim 1, comprising:
operating the receiver, based on a lack of receiving a management message, to allocate an over-the-air resource, and to send a negative acknowledgement to the transmitter, wherein the negative acknowledgement includes an indication of the allocated over-the-air resource.

8. The method of claim 1, wherein the transmitter resides at a mobile station.

9. The method of claim 1, wherein the transmitter resides at a base station.

10. A method for acknowledging management message reception in a wireless communication system, comprising:
assigning a sequence number to a management message to be delivered to a mobile station;
generating a packet that includes the sequence number and at least a portion of the management message, wherein the packet includes an indicator that signals an acknowledgement to the packet is required; and
causing the mobile station to send an acknowledgement based on receiving the packet, wherein the acknowledgement includes the sequence number of the received packet, wherein the mobile station sends the acknowledgement before decoding management message content in the received packet.

11. The method of claim 10, wherein generating the packet comprises generating multiple packets that include different fragments of the management message, respectively, wherein assigning the sequence number comprises assigning the sequence numbers to the fragments, the method comprising:
causing the mobile station to send an acknowledgement for each received fragment of the management message.

12. The method of claim 10, wherein the packet is a first packet, comprising:
starting a retransmission timer based on transmitting the first packet to the mobile station; and
transmitting, based on an expiration of the retransmission timer, a second packet to the mobile station, wherein the second packet is based on the first packet, wherein the second packet includes the sequence number and an indication that the second packet is a retransmission.

13. The method of claim 10, wherein the packet includes multiple management messages, and wherein the packet includes a unique sequence number for each of the included management messages.

14. The method of claim 10, further comprising:
causing the mobile station to (1) maintain a list of received sequence numbers associated with one or more management messages, (2) use the list to check for duplicate messages, and (3) update the list based on one or more message life time parameters.

15. The method of claim 14, wherein the packet includes a message life time parameter.

16. The method of claim 14, wherein the packet includes a message retransmission timer parameter.

17. The method of claim 10, further comprising:
allocating an over-the-air resource for a transmission of the acknowledgement, wherein the packet includes information about the allocated over-the-air resource.

18. The method of claim 10, wherein assigning the sequence number comprises using a set of sequence numbers of a management connection associated with the management message.

19. A wireless communication system, comprising:
multiple base stations configured to (1) assign a sequence number to a management message to be delivered to a mobile station, (2) generate a packet that includes the sequence number and at least a portion of the management message, the packet including an indicator that signals an acknowledgement to the packet is required, and (3) cause the mobile station to send an acknowledgement based on receiving the packet, wherein the acknowledgement includes the sequence number of the received packet, wherein the mobile station sends the acknowledgement before decoding management message content in the received packet.

20. The system of claim 19, wherein the base stations are configured to generate multiple packets that include different fragments of the management message, respectively, wherein the multiple packets each include a unique sequence number that is associated with a respective fragment of the management message, wherein the mobile station sends an acknowledgement for each received fragment of the management message.

21. The system of claim 19, wherein the acknowledgement is sent as a separate signaling message.

22. The system of claim 19, wherein the acknowledgement is included in a header of a packet data unit that contains a communication that is separate from the acknowledgement.

23. The system of claim 19, wherein the packet is a first packet, wherein the base stations are configured to start a retransmission timer based on transmitting the first packet to the mobile station and transmit, based on an expiration of the retransmission timer, a second packet to the mobile station, wherein the second packet is based on the first packet, wherein the second packet includes the sequence number and an indication that the second packet is a retransmission.

24. The system of claim 19, wherein the packet includes multiple management messages, and wherein the packet includes a unique sequence number for each of the included management messages.

25. The system of claim 19, wherein the packet includes an indication that signals an acknowledgement to the packet is required.

26. The system of claim 19, wherein the base stations are configured to cause the mobile station to (1) maintain a list of received sequence numbers associated with one or more management messages, (2) use the list to check for duplicate messages, and (3) update the list based on one or more message life time parameters.

27. The system of claim 26, wherein the packet includes a message life time parameter.

28. The system of claim 26, wherein the packet includes a message retransmission timer parameter.

29. The system of claim 19, wherein the base stations are configured to allocate an over-the-air resource for a transmission of the acknowledgement, wherein the packet includes information about the allocated over-the-air resource.

30. The system of claim 19, wherein the base stations are configured to selected the assigned sequence number from a set of sequence numbers of a management connection associated with the management message.

31. An apparatus, comprising:
transceiver circuitry to transmit and receive wireless radio signals; and
processor electronics, communicatively coupled with the transceiver circuitry, configured to (1) receive a packet that includes management message content, the packet including a sequence number unique to the management message content, and (2) send, before decoding the management message content, an acknowledgement to the management message content based on an acknowledgement requirement indication in the packet.

32. The apparatus of claim 31, wherein the processor electronics are configured to receive multiple packets that respectively include different fragments of the management message, wherein the multiple packets each include a sequence number that is unique to a fragment.

33. The apparatus of claim 31, wherein the acknowledgement is sent as a separate signaling message.

34. The apparatus of claim 31, wherein the acknowledgement is included in a header of a packet data unit that contains a communication that is separate from the acknowledgement.

35. The apparatus of claim 31, wherein the packet includes multiple management messages, and wherein the packet includes a unique sequence number for each of the included management messages.

36. The apparatus of claim 31, wherein the processor electronics are configured to (1) maintain a list of received sequence numbers associated with one or more management messages, (2) use the list to check for duplicate messages, and (3) update the list based on one or more message life time parameters.

37. The apparatus of claim 36, wherein the packet includes a message life time parameter.

38. The apparatus of claim 36, wherein the packet includes a message retransmission timer parameter.

39. The apparatus of claim 31, wherein the packet includes information about an allocated over-the-air resource for a transmission of the acknowledgement.

* * * * *